US007896732B2

(12) United States Patent
Benes et al.

(10) Patent No.: US 7,896,732 B2
(45) Date of Patent: Mar. 1, 2011

(54) CROP RESIDUE CHOPPING AND SPREADING SYSTEM FOR AN AGRICULTURAL COMBINE

(75) Inventors: Jason M. Benes, Mount Joy, PA (US); Joshua J. Wolters, Ellinwood, KS (US)

(73) Assignee: CNH America, New Holland, PA (US)

( * ) Notice: Subject to any disclaimer, the term of this patent is extended or adjusted under 35 U.S.C. 154(b) by 392 days.

(21) Appl. No.: 12/001,823

(22) Filed: Dec. 13, 2007

(65) Prior Publication Data
US 2009/0156277 A1 Jun. 18, 2009

(51) Int. Cl.
*A01F 12/40* (2006.01)

(52) U.S. Cl. .......................................... 460/112

(58) Field of Classification Search ............... 56/111, 56/112, 119, 901
See application file for complete search history.

(56) References Cited

U.S. PATENT DOCUMENTS

| | | | | |
|---|---|---|---|---|
| 3,712,309 | A | 1/1973 | Schmitz ...................... | 130/27 R |
| 4,292,795 | A | 10/1981 | Linn ........................... | 130/27 R |
| 4,637,406 | A | 1/1987 | Guinn et al. ................. | 130/27 R |
| 4,892,504 | A | 1/1990 | Scott et al. ................... | 460/112 |
| 4,913,679 | A | 4/1990 | Bender ........................ | 460/112 |
| 5,157,905 | A * | 10/1992 | Talbot et al. ................. | 56/15.9 |
| 5,833,533 | A * | 11/1998 | Roberg ........................ | 460/112 |
| 6,416,405 | B1 * | 7/2002 | Niermann .................... | 460/79 |
| 6,547,169 | B1 * | 4/2003 | Matousek et al. ............ | 239/661 |
| 6,616,528 | B2 * | 9/2003 | Wolters et al. ............... | 460/111 |
| 6,656,038 | B1 | 12/2003 | Persson ....................... | 460/112 |
| 6,663,485 | B2 | 12/2003 | Niermann .................... | 460/79 |
| 6,685,558 | B2 | 2/2004 | Niermann et al. ........... | 460/111 |
| 6,719,627 | B2 * | 4/2004 | Wolters et al. ............... | 460/111 |
| 6,736,721 | B2 | 5/2004 | Niermann et al. ........... | 460/112 |
| 6,863,605 | B2 * | 3/2005 | Gryspeerdt et al. .......... | 460/111 |
| 6,881,145 | B2 | 4/2005 | Holmen ....................... | 460/112 |
| 6,893,340 | B1 | 5/2005 | Schmidt et al. .............. | 460/111 |
| 2003/0114207 | A1 | 6/2003 | Wolters et al. ............... | 460/111 |
| 2004/0092298 | A1 | 5/2004 | Holmen ....................... | 460/111 |
| 2006/0166723 | A1 * | 7/2006 | Farley et al. ................. | 460/112 |

FOREIGN PATENT DOCUMENTS

EP 631717 A1 * 1/1995

* cited by examiner

*Primary Examiner* — Thomas B Will
*Assistant Examiner* — Joan D Misa
(74) *Attorney, Agent, or Firm* — Patrick M. Sheldrake; Michael G. Harms

(57) ABSTRACT

A system for chopping and spreading crop residue produced by an agricultural combine wherein the spreader is advantageously disposed directly rearwardly of a cleaning system of the combine for receiving chaff and other crop residue directly therefrom, without aid of a mechanism to convey the chaff to the spreader, and wherein the chopper is disposed just above and/or rearwardly of the spreader and is configured for discharging crop residue from the threshing system of the combine into the spreader for spreading thereby with the chaff.

11 Claims, 10 Drawing Sheets

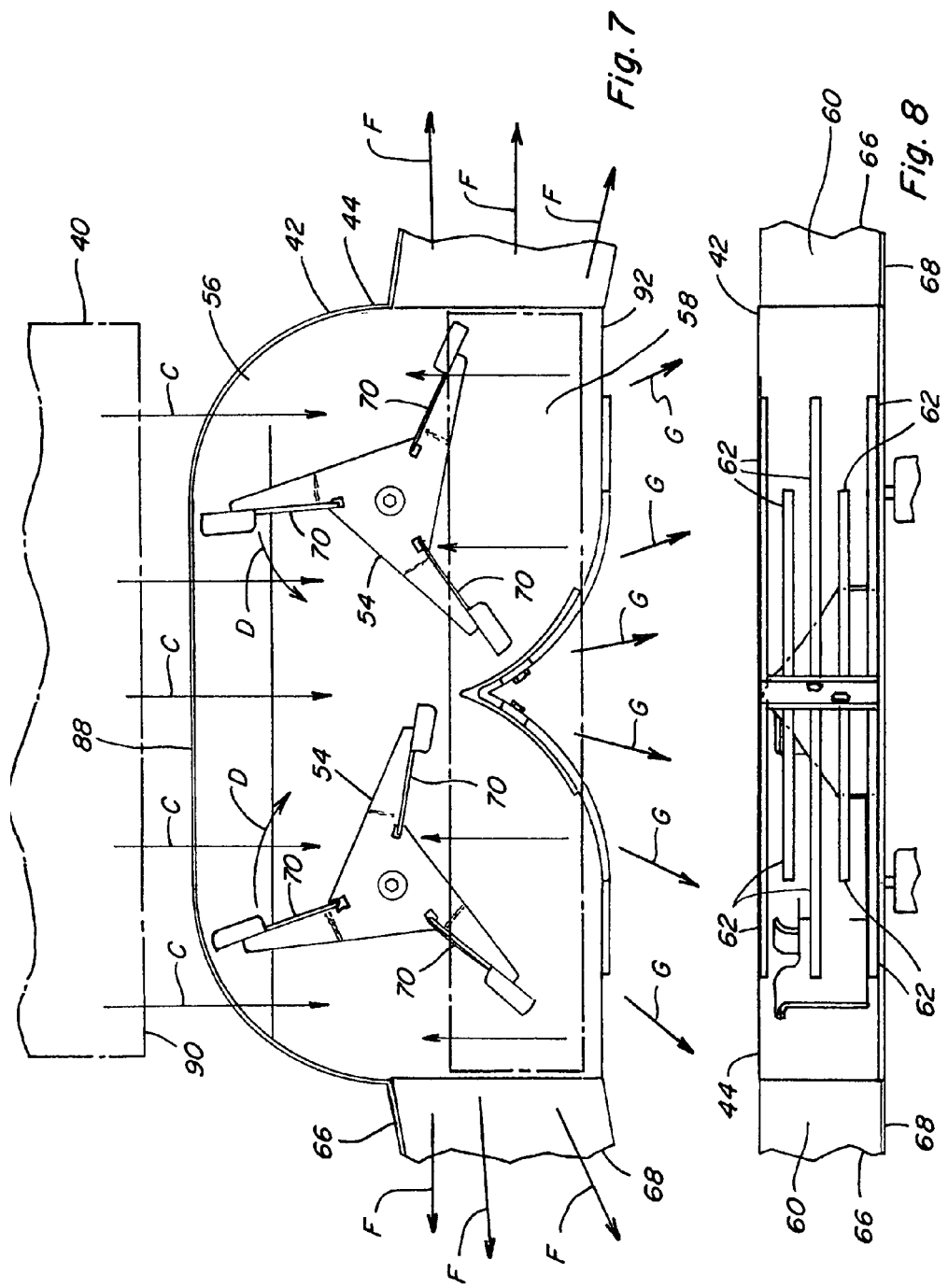

US 7,896,732 B2

CROP RESIDUE CHOPPING AND SPREADING SYSTEM FOR AN AGRICULTURAL COMBINE

TECHNICAL FIELD

This invention relates generally to a system for chopping and spreading crop residue produced by an agricultural combine, and more particularly, to a chopping and spreading system wherein the spreader is advantageously disposed directly rearwardly of a cleaning system of the combine for receiving chaff and other crop residue directly therefrom, without aid of a mechanism to convey the chaff to the spreader, and wherein the chopper is disposed just above and/or rearwardly of the spreader and is configured for discharging crop residue from the threshing system of the combine into the spreader, such that the chaff is mixed and advantageously spread with the other crop residue.

BACKGROUND ART

Crop residue produced by a modern combine is typically generated by two sources, and is of two consistencies. One source is the threshing and separating system, which produces a large volume of crop residue that has a larger, heavier consistency, typically including fragments of stalks, stems, cobs, and leaves. The other source is the cleaning system, which produces a much lower volume of much smaller, lighter elements, such as pod and husk fragments, and particulates, commonly referred to as chaff. The larger, heavier crop residue is typically easier to spread over a wide swath, due to its mass, whereas the chaff is more difficult, due to its lower mass. Wind will also present a difficulty to spreading chaff evenly.

Recent trends have been toward larger combines having wider headers capable of harvesting swaths of forty feet and wider. Another recent trend is to attempt to spread the crop residue as evenly as possible over the width of a swath, with less clumping, to provide benefits such as more even breakdown and decomposition of the residue for improving soil composition, improved soil coverage and erosion prevention for conservation, and more uniform soil temperature, moisture distribution, and other conditions for germination and emergence of the next crop. This latter trend presents a challenge, primarily due to the above-mentioned difficulty of spreading smaller and lighter chaff over wider swaths.

One approach that has been generally successful for achieving wider chaff spreading, has been to spread the chaff mixed with the larger residue. This has been found to be successful in some instances, as the larger crop residue essentially helps to carry the lighter chaff. Reference in this regard, Schmidt et al., U.S. Pat. No. 6,893,340 entitled Rotary Accelerating Apparatus for a Vertical Straw and Chaff Spreader of an Agricultural Combine, which has been found to provide a satisfactory combined straw and chaff spreading capability over a wide swath. However, for many applications, particularly when harvesting small grains such as wheat and legumes such as soybeans, it is additionally desired to provide a capability for chopping the larger crop residue prior to spreading.

Integrating a chopping capability with mixed straw and chaff spreading, can be problematic for several reasons, particularly with regard to material flow. Many known combines are equipped to convey or propel the crop residue from the threshing and separating system rearwardly through a rear cavity of the combine to a rear end thereof. At the rear end, the crop residue will be either discharged directly onto the field, for instance, in a windrow (mainly straw), or directed into a chopper, which will chop and distribute the residue on the field. A separate spreader can also be provided for spreading the chopped residue. Reference in this regard Roberg, U.S. Pat. No. 5,833,533, entitled Harvester Thresher.

In a combine, the chaff is typically discharged from the cleaning system at a more forward location, relative to the chopped residue from the threshing and separating system, and to mix the chaff with the crop residue from the separating system, the flow of chaff and the flow of chopped residue must be brought together. Reference in this regard, Guinn et al., U.S. Pat. No. 4,637,406, entitled Chaff and Straw Spreading Attachment for Combines, which illustrates use of a fan for blowing a stream of chaff into a chopper for mixing with the chopped residue from the separating system. Reference also, Holmen, U.S. Pat. No. 6,881,145, entitled Harvester Combine, which uses a large inclined pan for conveying the chaff rearwardly to a spreader operable for propelling and mixing the chaff into a chopped residue flow from a chopper. However, both of these disclosures require some additional apparatus, e.g., a fan or pan, for carrying the chaff rearwardly. Additionally in the latter disclosure, the mixed flow is primarily directed rearwardly from the combine, and it can be difficult to provide uniform crop residue coverage over a wide swath e.g., 40 or more feet, using a rearwardly directed discharge pattern, as opposed to a sidewardly directed pattern.

Thus, what is sought is apparatus that overcomes at least one of the problems, shortcomings and disadvantages set forth above.

SUMMARY OF THE INVENTION

What is disclosed is a system for chopping and spreading crop residue produced by an agricultural combine, which overcomes at least one of the problems, shortcomings and disadvantages, set forth above.

According to a preferred aspect of the invention, a rotary spreader is advantageously disposed directly rearwardly of a cleaning system of the combine for receiving chaff and other crop residue directly therefrom, without aid of a mechanism or apparatus, e.g., a fan or pan, to convey the chaff to the spreader. The chopper is disposed just above and/or rearwardly of the spreader, and is configured for discharging crop residue from the threshing system into the spreader. As a result, the smaller, lighter chaff is mixed and carried with the larger, heavier elements of the residue from the threshing system, so as to be more evenly and broadly spread over the width of a harvested swath of a field According to another preferred embodiment of the invention, the rotary impeller or impellers of the spreader are oriented so as to rotate about a generally vertical axis, and the chopper is disposed above the spreader, such that a discharge opening of the chopper housing is disposed above an inlet opening of the spreader housing, such that the crop residue will be propelled downwardly from the discharge opening into the spreader housing. Alternatively, or additionally, the chopper can be disposed rearwardly of the spreader, and include a discharge opening facing forwardly and toward the spreader, such that the crop residue will be propelled forwardly from the discharge opening of the chopper into the spreader.

According to another preferred embodiment of the invention, the impeller or impellers of the spreader are oriented so as to rotate about a generally horizontal axis, and a discharge opening of the chopper housing is disposed rearwardly of an inlet opening of the spreader housing, such that the crop residue will be propelled forwardly from the discharge opening into the spreader housing. The chopper housing can be located directly above the spreader, above and rearwardly thereof, or directly rearwardly thereof, as desired or required for a particular application.

According to another preferred aspect of the invention, the combine includes a deflector element or elements within the rear cavity thereof, above the chopper, configurable in a windrowing configuration for directing the stream of crop residue from the threshing system over the chopper and outwardly from the cavity.

And, according to another preferred aspect of the invention, structure is provided in the cavity of the combine, configurable in a non-chopping configuration for directing the stream of crop residue from the threshing system downwardly in front of the chopper housing and into the spreader.

BRIEF DESCRIPTION OF THE DRAWINGS

FIG. 7 is a simplified top view of the rear end of the combine and the spreader of the system;

FIG. 8 is a rear view of the spreader of FIG. 7;

DETAILED DESCRIPTION OF THE INVENTION

Figure 1:
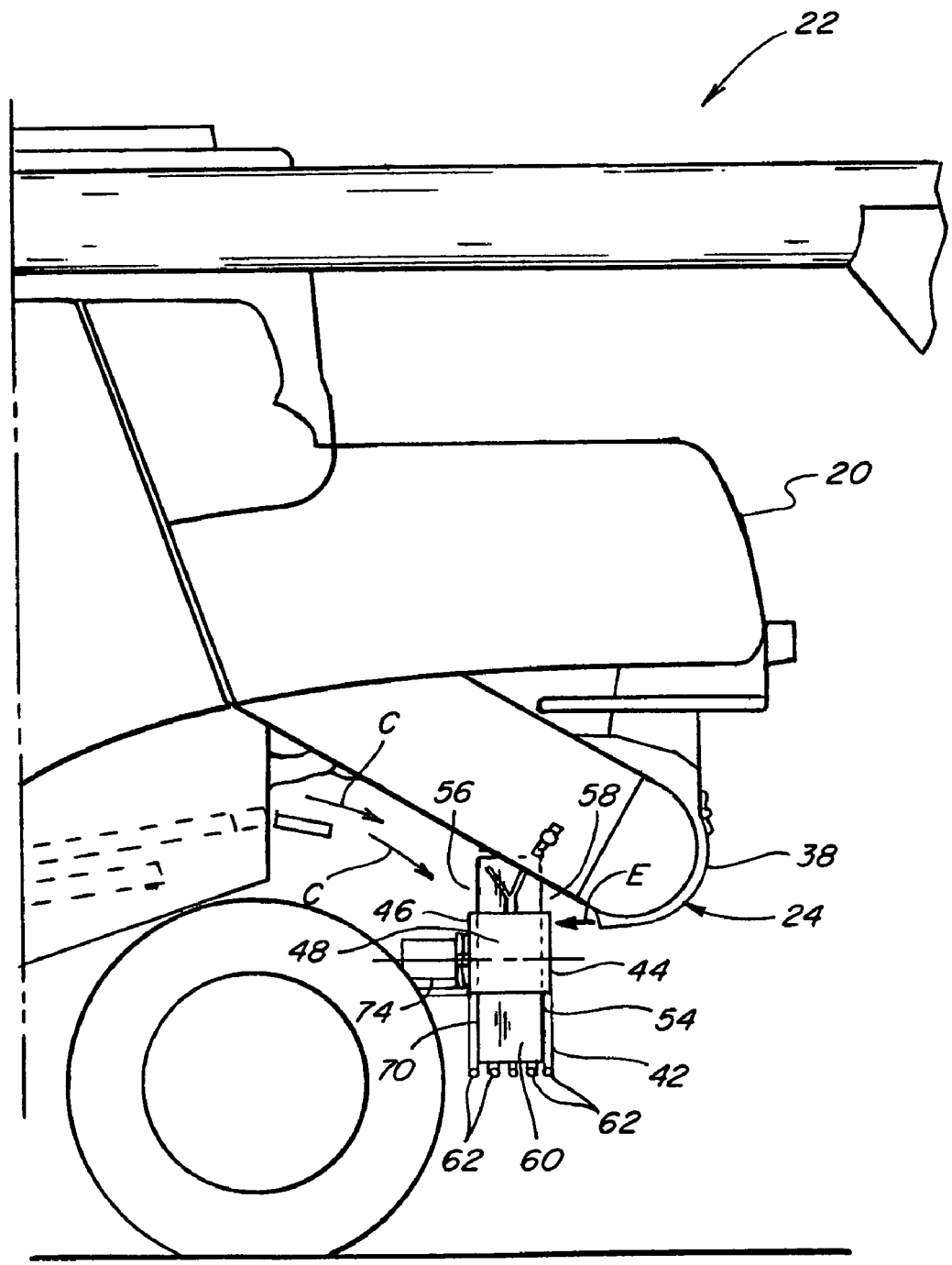
FIG. 1 is a fragmentary, simplified representation of a rear end of an agricultural combine, including a system for chopping and spreading crop residue according to the present invention.
Figure 2:
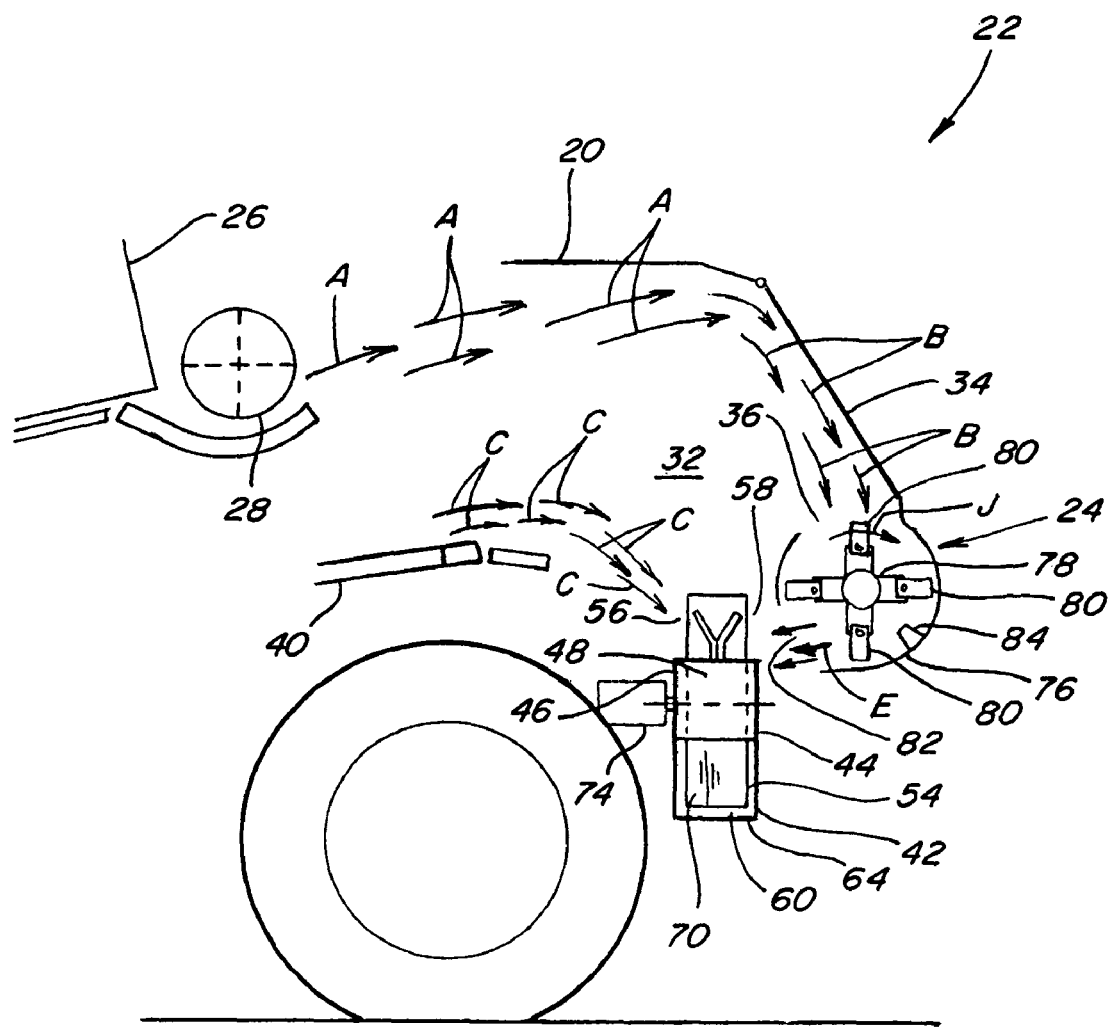
FIG. 2 is a simplified schematic side view of the rear end of the combine and system of FIG. 1, illustrating crop residue flow with the system in a chopping mode.

Referring now to the drawings, wherein preferred embodiments of the present invention are shown, in FIGS. 1 and 2, a rear end 20 of a typical self-propelled agricultural combine 22 is shown, including a system 24 for chopping and spreading crop residue, constructed and operable according to the present invention. Briefly, combine 22 includes a threshing and separating system 26 operable for separating straw, including stalks, cobs, stems, leaves, weeds and other larger plant matter, hereinafter referred to collectively as straw, from the harvested crop, and feeds that material to a rotating straw walker, or a beater mechanism 28, which carries or propels a stream 30 of the straw rearwardly, denoted by arrows A through an internal rear cavity 32 of combine 22 and against a rear deflector plate 34, which helps deflect the stream 30 downwardly, denoted by arrows B, into an inlet opening 36 of a chopper 38 of system 24 of the invention. At the same time, a cleaning system 40 of combine 22 separates chaff, such as seed pods and husks, from the threshed grain, using a rearwardly and upwardly directed flow of air from a forwardly located fan (not shown) and blows and directs a flow of the air and chaff, denoted by arrows C, rearwardly toward a spreader 42 of system 24.

Figure 3:
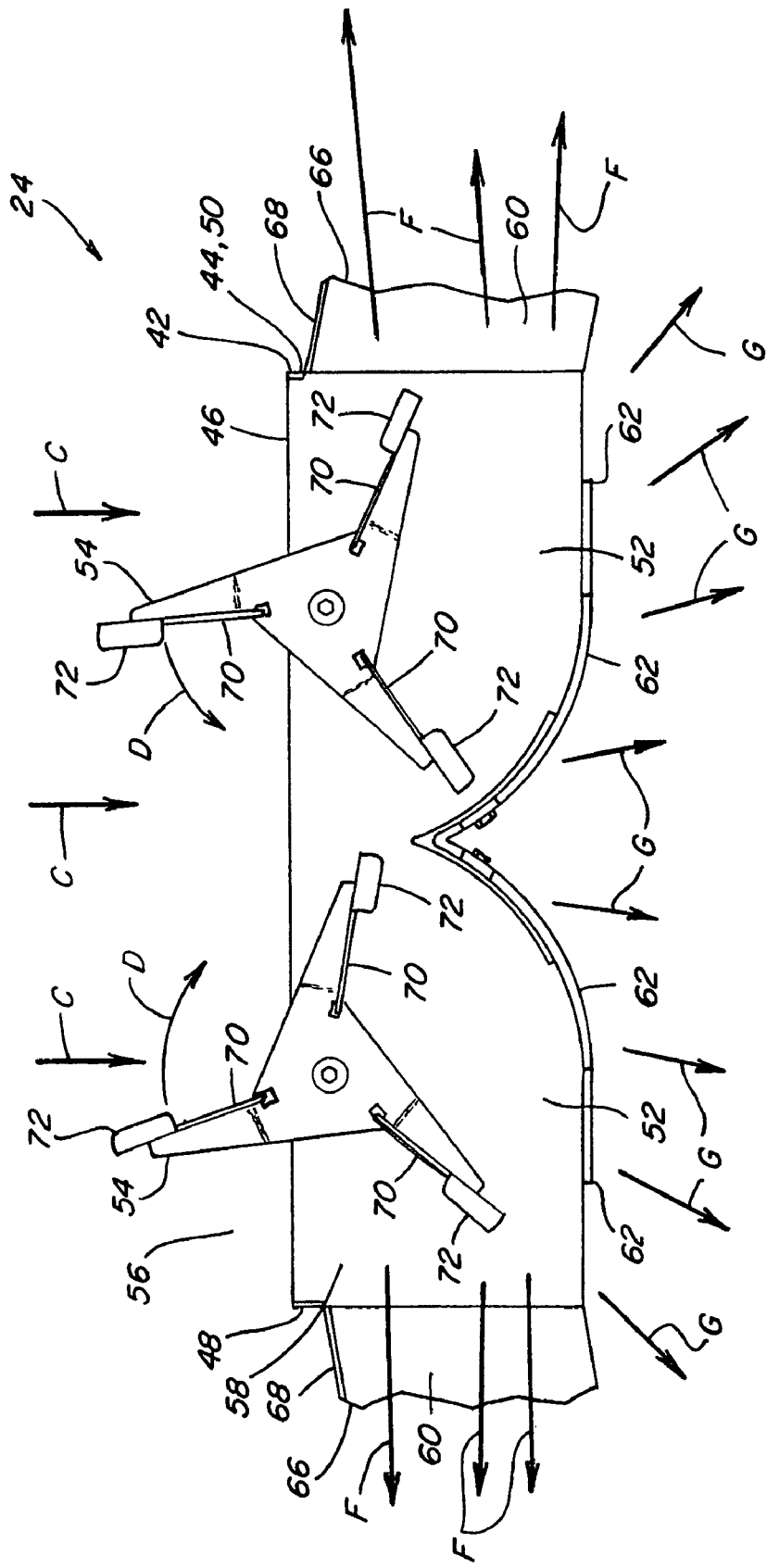
FIG. 3 is a simplified rear view of a spreader of the system of FIG. 1.

Referring also to FIG. 3, wherein only spreader 42 of system 24 is shown, spreader 42 includes a spreader housing 44 having a front wall 46 and side walls 48 and 50, defining and partially enclosing a pair of side-by-side spaces 52, each including a rotary crop residue impeller 54 for rotation therein in a predetermined rotational direction, as denoted by arrows D. Spreader housing 44 can be supported using suitable structure, such as using brackets (not shown) connected to appropriate structural elements of rear end 20 of combine 22, in the well-known manner. Spreader housing 44 defines a forwardly located, forwardly and upwardly facing inlet opening 56, positioned for receiving the flow of air and airborne chaff denoted by arrows C, from cleaning system 40. Spreader housing 44 additionally defines a rearwardly located and facing inlet opening 58, positioned for receiving a flow of crop residue, denoted by arrows E, from chopper 38. Here, spreader housing 44 is illustrated as being completely upwardly open, such that inlet openings 56 and 58 are connected or essentially coextensive, but, as an alternative, housing 44 can include an upper cover, or other structure such as, but not limited to, appropriate deflectors or the like, having a suitable extent, to separate inlet openings 56 and 58, as desired or required for achieving the residue induction and spreading capabilities sought. Similarly, housing 44 is illustrated as having a rear end that is completely open, but can include a lower cover of suitable extent, or deflectors, as desired or required for achieving the residue induction and spreading capabilities sought.

Spreader housing 44 additionally includes opposite, sidewardly facing outlet openings 60, through which the crop residue (flows denoted by arrows C and E) received through inlet openings 56 and 58, is to be discharged, as denoted by arrows F and G in FIG. 3. Here, in FIGS. 1 and 3, a lower extent of each of outlet openings 60 is illustrated as being bounded by an array of downwardly and sidewardly curved rods 62, which function to guide portions of the discharged flows sidewardly and outwardly away from spreader 42 (arrows F), while also allowing portions of the flows (arrows G) to flow downwardly, beneath spreader 42. FIG. 2 alternatively illustrates spreader housing 44 as having a bottom plate 64, defining a lower extent of each outlet opening 60 and enclosing the bottom of housing 44. Additionally, in FIG. 3, housing 44 is illustrated including optional front flow guides 66, and upper flow guides 68, bounding front and upper peripheries, respectively, of outlet openings 60, for guiding the flows F of crop material from housing 44. Rods 62 (if used), bottom plate 64 (if used), and guides 66 and 68 (if used) can optionally be adjustable, as well known in the art, to provide a desired pattern of crop residue deposition on a field, for instance, a uniform thin layer of crop residue across an entire swath of a harvested field corresponding in width to a width of a header (not shown) of the combine performing the harvesting operation. It is also anticipated that other shapes and configurations of apparatus may be utilized in connection with outlet openings 60, for achieving desired crop deposition characteristics, such as, but not limited to, uniformity and/or thickness of crop residue deposition over a swath of a desired width.

Here also, it should be noted that impellers 54 of spreader 42 are depicted as being three bladed structures having generally rectangular paddles or blades 70 oriented to face directly in the directions of rotation D. Additionally, the front and rear edges of blades 70 are depicted as having front and rear outer edges 72 which extend in directions of rotation D. This impeller configuration is contemplated to be illustrative of a variety of impellers that may be utilized for crop residue spreading according to the invention, and thus is not intended to be limiting. Generally though, an impeller configuration and operating speed that promotes induction of the lighter, less forceful flow of airborne chaff into housing 44, and which mixes the chaff with the crop residue received from chopper 38, will be desirable. The impeller configuration of Schmidt et al., U.S. Pat. No. 6,893,340 entitled Rotary Accelerating Apparatus for a Vertical Straw and Chaff Spreader of an Agricultural Combine, the disclosure of which is hereby incorporated herein by reference in its entirety, may provide a suitable alternative for some applications.

Additionally, as the forwardly directed flow of crop residue from chopper 38 will be relatively forceful, front wall 46 of spreader housing 44 as illustrated has a sufficient upward extent to contain the forwardly directed flow E, and prevent its passage forwardly of the spreader, in any significant amount. It will also be desired for spreader 42 to have the capability to accelerate and redirect forwardly directed crop residue flows E, in rotational directions D, such that the energy imparted to the crop residue flow E by chopper 38 is not completely dissipated, and also such that it does not deflect or blunt the lesser, weaker flow of chaff away from the spreader, and further such that the mixed flows will be propelled from the spreader with sufficient energy to travel the desired distance for deposition on a field. To achieve this, the impellers will be driven using suitable drives 74, which can comprise, for instance, fluid or electric motors, belt drives, or gear boxes, operable for driving the impellers with sufficient speed and force for accelerating and redirecting the crop residue flow from the chopper, and also the chaff flow from the cleaning system. Here, it should again be noted that the size and configuration of impellers 54, and outlet openings 60 of spreader housing 44 can be varied, as required, for a particular application, to provide desired crop residue mixing, propulsion, and deposition characteristics.

Referring more particularly to FIG. 2, chopper 38 illustrated is of generally conventional construction and operation, including a chopper housing 76 containing a rotary driver which can be, for instance, an elongate, sidewardly extending shaft, carrying a plurality of knives 80, which can be, for instance, flail type knives, and being rotatable, as denoted by arrow J, for chopping and propelling the crop residue within chopper housing 76, in the well known manner. Chopper 38 differs from conventional chopper configurations, however, in that housing 76 includes a forwardly facing discharge opening 82, positioned and oriented to direct the flow of crop residue, denoted by arrows E, forwardly into inlet opening 58 of spreader 42. Chopper housing 76 additionally can include an optional bank of fixed knives 84, at a desired location in the path of rotating knives 80, for performing a desired crop residue chopping function in cooperation therewith. The configuration of system 24 shown, is a crop residue chopping configuration, wherein the residue from threshing and separating system 26 is directed into inlet opening 36 of chopper 38 for chopping thereby, the discharge of chopper 38 being directed forwardly into spreader 42 for mixing and spreading with the chaff from cleaning system 40.

Figure 4:
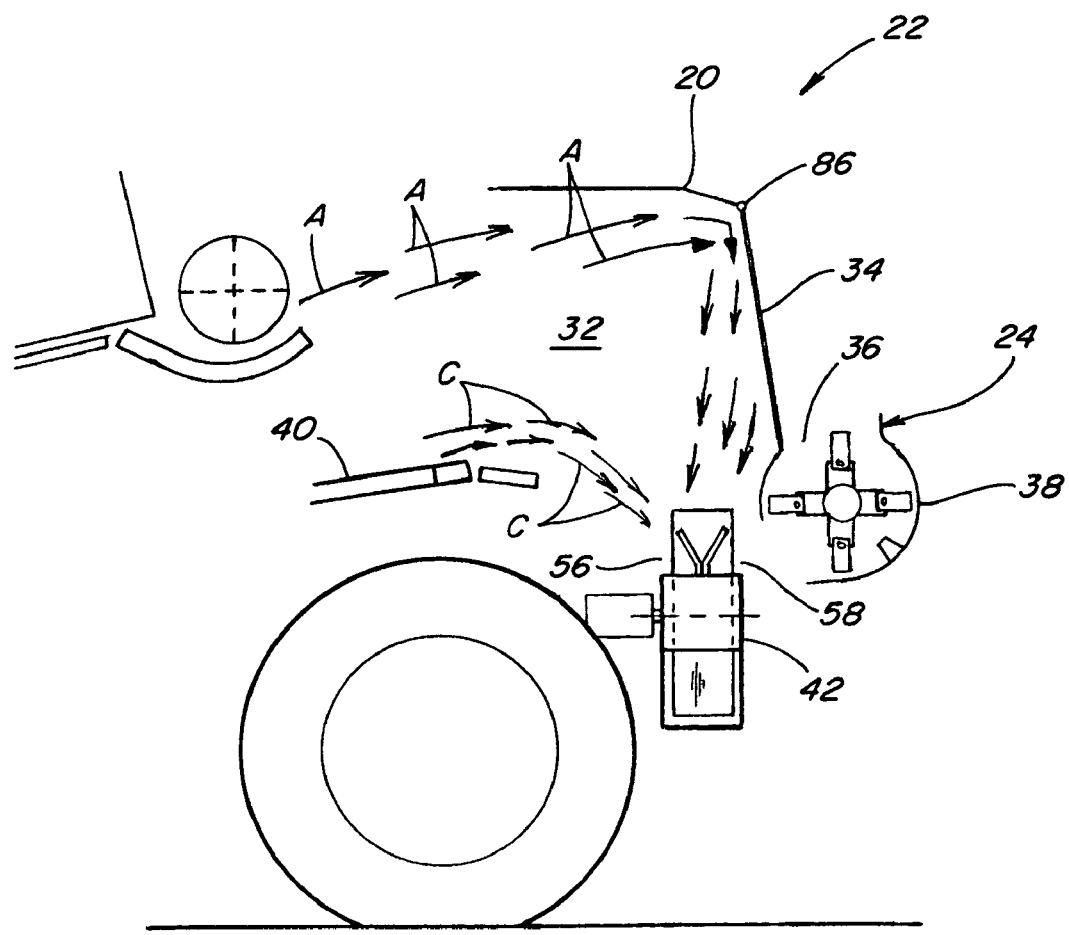
FIG. 4 is a simplified schematic side view of the rear end of the combine and system of FIG. 1, illustrating crop residue flow with the system in a non-chopping mode.

Referring also to FIG. 4, system 24 of the invention is illustrated in a non-chopping mode or configuration, wherein rear deflector plate 34 located within rear cavity 32 of combine 22 is configured and positioned in covering or closing relation to inlet opening 36 of chopper 38, as opposed to an open position in relation thereto, as illustrated in FIG. 2. Deflector plate 34 can be hingedly or otherwise suitably mounted in rear cavity 32, such as using a hinge 86 mounted to an upper sheet of rear end 20 to achieve this versatility. Alternatively, other structure that achieves this purpose, can also be used. In this mode, by closure of inlet opening 36, crop residue flow, denoted by arrows A, from the threshing and separating system is deflected as illustrated, forwardly of chopper 38, and downwardly, toward the upper portion of spreader 42, so as to enter inlet opening 56 and/or inlet opening 58 thereof, for spreading by the spreader with the chaff (flow C) from cleaning system 40, in the above-explained manner. This non-chopping mode would typically be used when harvesting corn, and thus the flow, denoted by arrows A, would typically comprise elements of cobs, stems, leaves and the like, but it is recognized that it could be used for other crops as well.

Figure 5:
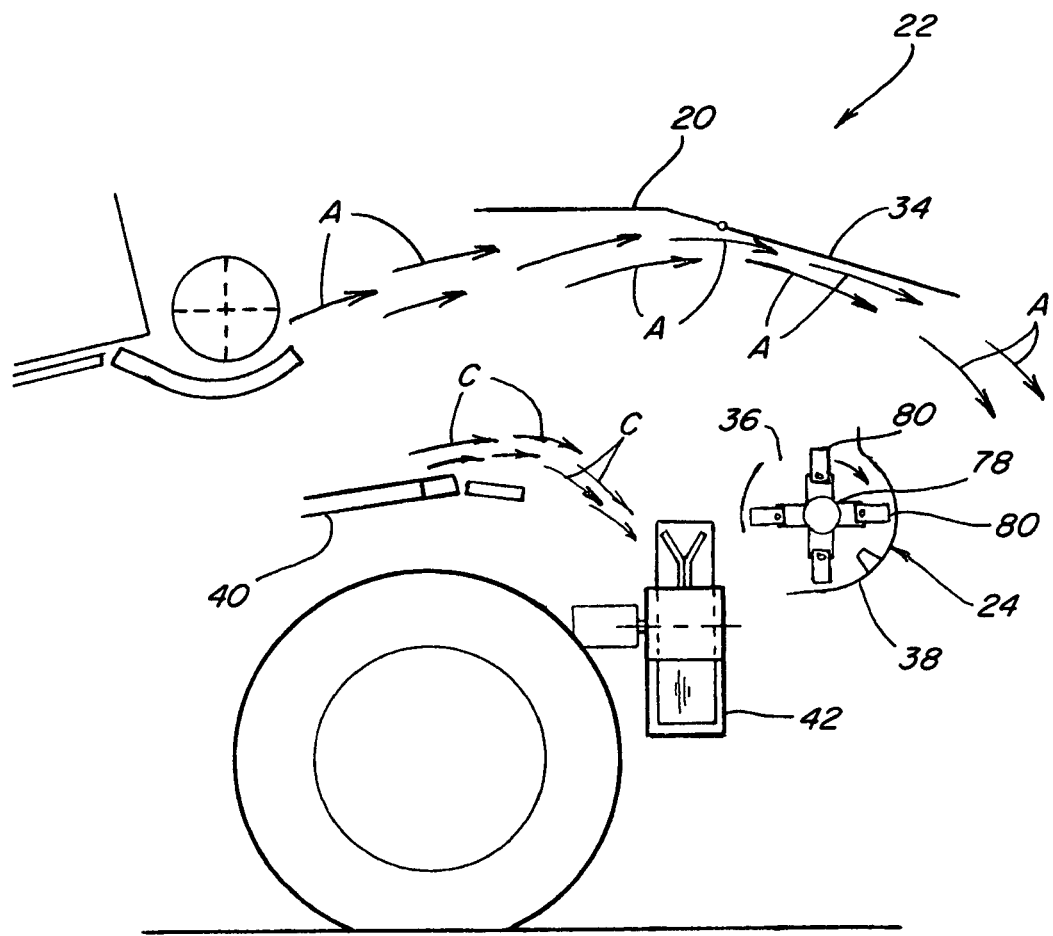
FIG. 5 is a simplified schematic side view of the rear end of the combine and system of FIG. 1, illustrating crop residue flow in a windrowing mode.

Referring also to FIG. 5, system 24 of the invention is illustrated in a windrowing mode or configuration, wherein rear deflector plate 34 is repositioned in an open position, to thereby open rear end 20 of combine 22, for the flow or stream of crop residue, denoted by arrows A, from the threshing system, over chopper 38, so as to be deposited in a windrow on the surface of a field behind combine 22. The flow of chaff, denoted by arrows C, from cleaning system 40, is directed into spreader 42, for deposition on the field by the spreader, in a wider pattern than that of the windrow. As noted above, deflector plate 34 can be hingedly or otherwise suitably mounted for this purpose. Additionally, inlet opening 36 of chopper 38 is illustrated as being open, with rotary driver 78 and knives 80 rotating in the clockwise direction, for chopping of any crop residue flow which falls into chopper 38, and directing the chopped residue into spreader 42. Alternatively, inlet opening could be covered, and knives 80 not rotated.

Figure 6:
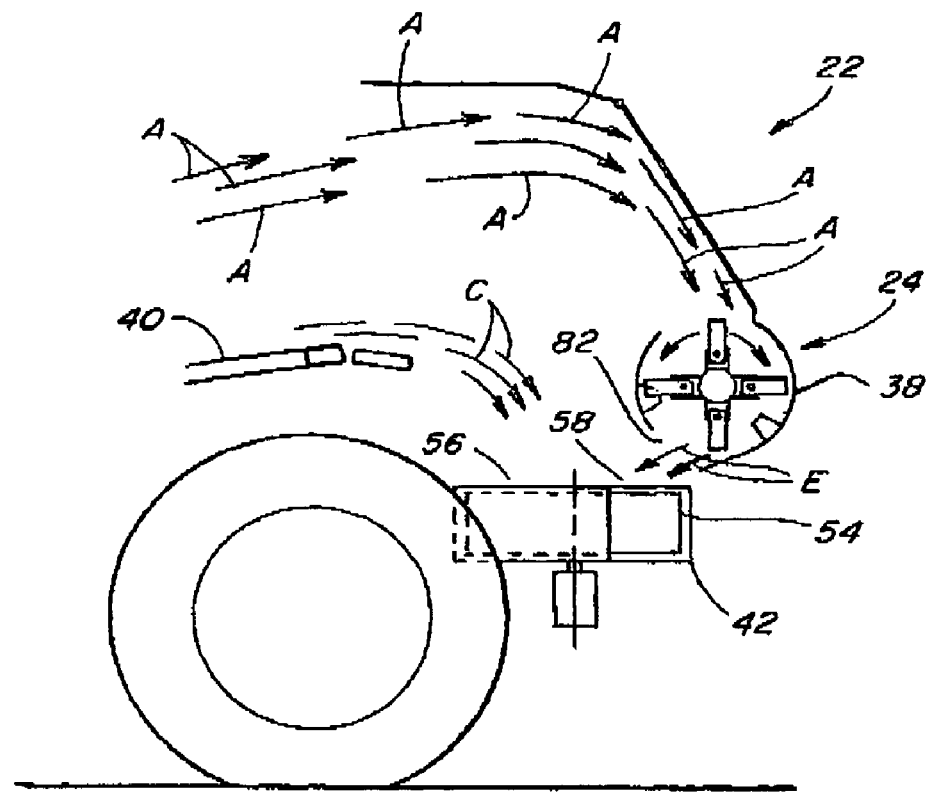
FIG. 6 is a simplified schematic side view of the rear end of the combine, showing a system of the invention including an alternative spreader configuration, illustrating crop residue flow in a chopping mode.

Referring also to FIGS. 6, 7 and 8, system 24 for chopping and spreading crop residue, is illustrated with spreader 42 configured in a horizontal orientation, wherein impellers 54 are rotatable about a vertical axis. Impellers 54 are again depicted as being three bladed structures having generally rectangular paddles or blades 70 oriented to face directly in the directions of rotation D. Again, this impeller configuration is contemplated to generate induction of chaff, denoted by arrows C, into generally the more forward region of spreader 42, for mixing into the crop residue flow (arrows E) from chopper 38, such that the mixture will be propelled sidewardly in a desired manner and to the desired extent, from spreader 42. The impeller configuration of Schmidt et al., U.S. Pat. No. 6,893,340 entitled Rotary Accelerating Apparatus for a Vertical Straw and Chaff Spreader of an Agricultural Combine, incorporated herein by reference in its entirety, may provide a suitable alternative for this application also.

For this configuration, inlet openings 56 and 58 of spreader 42 are preferably upwardly facing, and essentially comprise the entire upper region of spreader housing 44, which, as a result, is completely open. In this configuration, a forwardly facing front end 88 of spreader housing 44 is located closely adjacent to a rear end 90 of cleaning system 40, and a rear end 92 is illustrated as being partially enclosed by curved rods 62. The opposite sides of spreader housing 44 include outlet openings 60, respectively, bounded by guide structure, such as guide plates 66 and 68, guide plates 68 here being disposed above and/or below outlet openings 60, as desired or required for achieving the spread pattern sought.

Here, it should be observed that when spreader 42 is in this orientation, it essentially spans most of the fore and aft distance between rear edge 90 of cleaning system 40, and chopper 38, so as to be advantageously disposed generally beneath discharge opening 82 of chopper 38. As result, inlet opening 58 of spreader 42 is located generally below discharge opening 82, and opening 82, in turn, is configured for directing the crop residue flow, denoted by arrow E, downwardly as well as forwardly, into inlet opening 58.

In operation, the crop residue received through inlet openings 56 and 58, is propelled sidewardly from spreader 42 through outlet openings 60, as denoted by arrows F, and also rearwardly to a more limited extent, as denoted by arrows G in FIG. 7, to provide a desired pattern of crop residue deposition on a field, for instance, a uniform thin layer of crop residue across an entire swath of a harvested field corresponding in width to a width of a header (not shown) of the combine performing the harvesting operation. Here again, it is also anticipated that other shapes and configurations of apparatus may be utilized in connection with outlet openings 60, for achieving desired crop deposition characteristics, such as, but not limited to, uniformity and/or thickness of crop residue deposition over a swath of a desired width.

Figure 9:
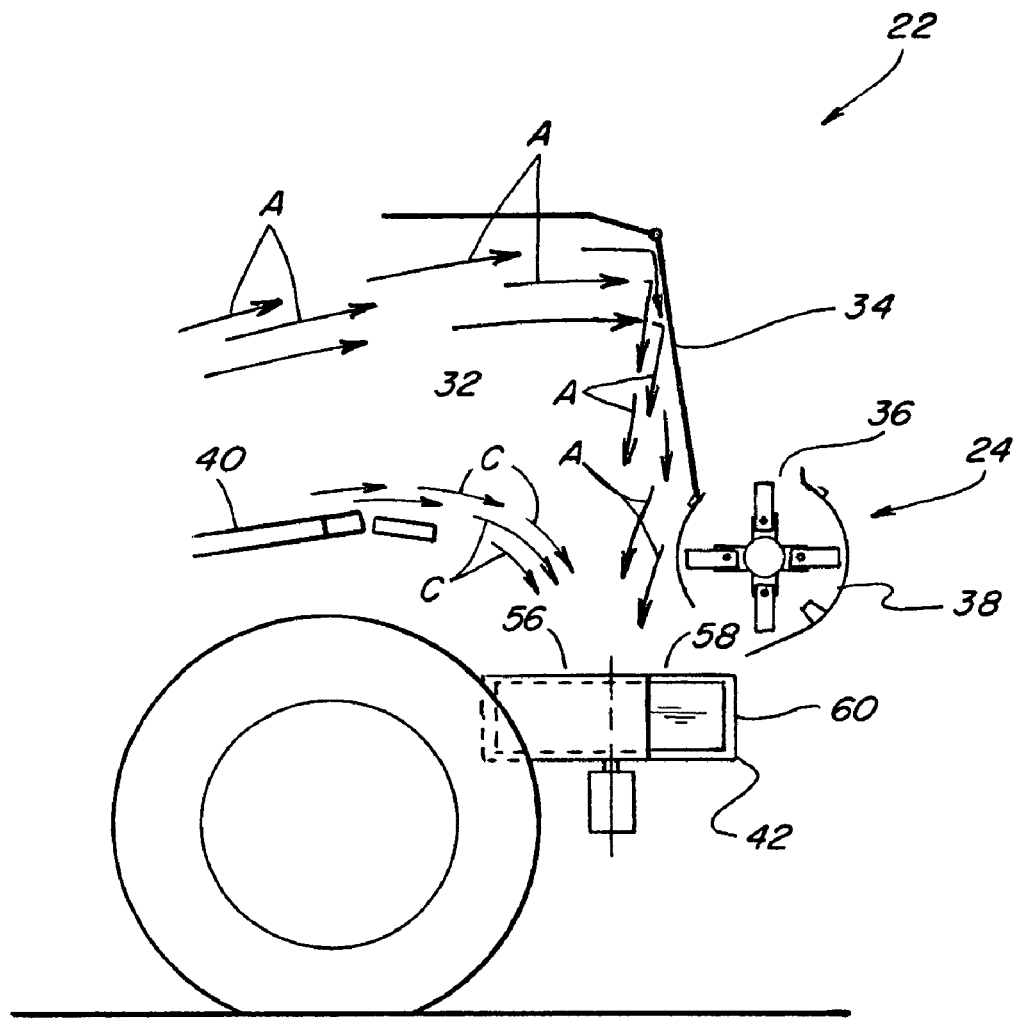
FIG. 9 is a simplified schematic side view of the rear end of the combine and system of FIG. 6, illustrating crop residue flow with the system in a non-chopping mode.

Referring also to FIG. 9, system 24 of the invention utilizing spreader 42 in the orientation of FIGS. 6, 7 and 8, is illustrated in a non-chopping mode or configuration, wherein deflector plate 34 in rear cavity 32 of combine 22 is positioned in covering, blocking or closing relation to inlet opening 36 of chopper 38, as opposed to an open position in relation thereto, as illustrated in FIG. 6. In this mode, by closure of inlet opening 36, crop residue flow, denoted by arrows A, from the threshing and separating system is deflected as illustrated, forwardly of chopper 38, and downwardly, so as to enter the open upper end of spreader 42, through inlet opening 56 and/or inlet opening 58 thereof, and so as to be propelled sidewardly outwardly through openings 60, with the chaff (flow C) from cleaning system 40, in the above-explained manner. As before, this non-chopping mode would typically be used when harvesting corn, and thus the flow, denoted by arrows A, would typically comprise elements of cobs, stems, leaves and the like, but it is recognized that it could be used for other crops as well.

Figure 10:
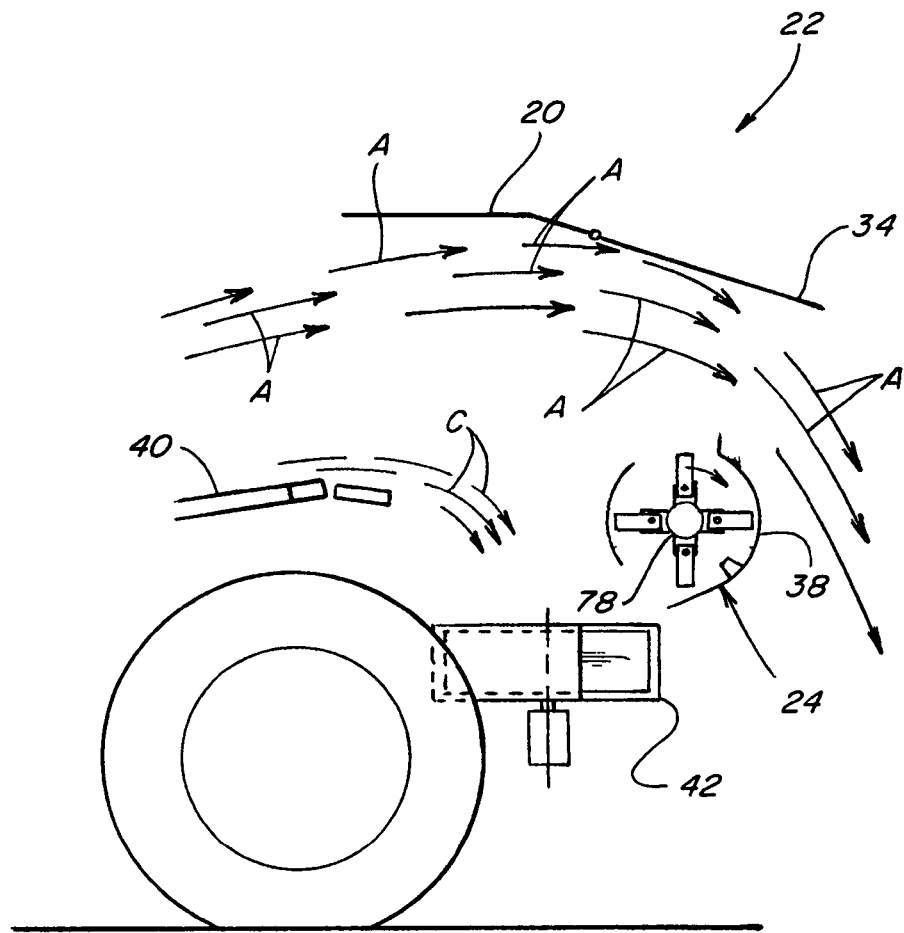
FIG. 10 is a simplified schematic side view of the rear end of the combine and system of FIG. 6, illustrating crop residue flow in a windrowing mode.

Referring also to FIG. 10, system 24 of the invention is illustrated in a windrowing mode or configuration, wherein rear deflector plate 34 is repositioned in an open position, to thereby open rear end 20 of combine 22, for the flow or stream of crop residue, denoted by arrows A, from the threshing system, over chopper 38, so as to be deposited in a windrow on the surface of a field behind combine 22. The flow of chaff, denoted by arrows C, from cleaning system 40, is directed into spreader 42, for deposition on the field by the spreader, in a wider pattern than that of the windrow. Again, deflector plate 34 can be hingedly or otherwise suitably mounted for this purpose. Additionally, rotary driver 78 and knives 80 of chopper 38 can optionally be rotated in a clockwise direction as illustrated, to facilitate chopping of straw that falls from flow A, through inlet opening 36 of the chopper. Again, inlet opening 36 could alternatively be covered.

Figure 11:
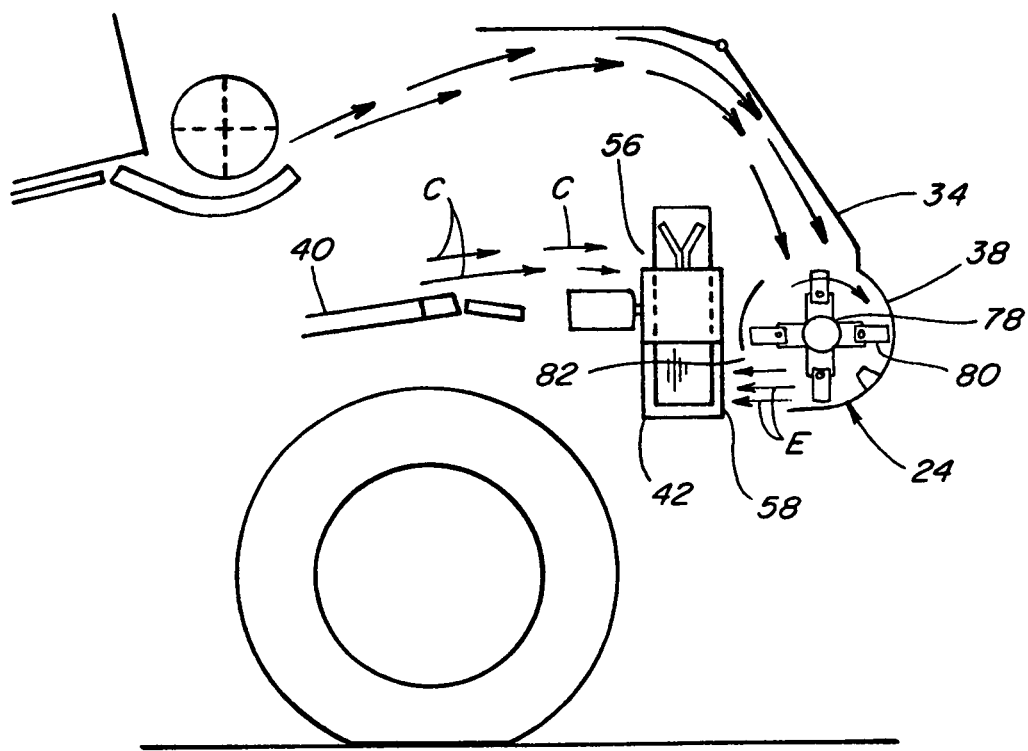
FIG. 11 is a simplified schematic side view of the rear end of the combine and system of FIG. 6, illustrating the chopper of the system in an alternative position rearwardly of the spreader of the system.

Referring also to FIG. 11, system 24 of the invention is illustrated in an alternative configuration wherein chopper 38 is positioned directly rearwardly of spreader 42. In this embodiment, deflector plate 34 is closed in a straw chopping configuration, and discharge opening 82 of chopper 38 is forwardly directed. Rotary driver 78 and knives 80 of chopper 38 are rotated as illustrated to discharge crop residue, as denoted by arrows E, forwardly into rear inlet opening 58 of spreader 42. To facilitate this, rear inlet opening 58 comprises at least a lower portion of the rear end of spreader 42. Chaff, denoted by arrows C, from cleaning system 40 is directed into forward inlet opening 56, in the above explained manner. This configuration illustrates versatility of the system of the invention, and can be advantageous as it allows the flows of chaff and straw to enter the spreader in vertically offset relation, wherein the chaff enters at a more upper region of the spreader, and the straw at a lower region, such that there is a reduced risk of the more powerful straw flow into the spreader interfering with the chaff flow into the spreader, and such that better mixing of the straw and chaff may be achieved.

Here, it should be noted that although spreader 42 of system 24 of the invention is shown in a horizontal orientation, and in a vertical orientation, other orientations are also contemplated, such as any of a range of angled orientations between these orientations. It should also be noted that a chopper incorporated into system 24 can be otherwise configured, for instance, so as to include a different knife arrangement, in accordance with the present invention. Still further, although as an advantage of the embodiments shown, the overall rearward extent of a combine can be relatively shortened compared to combines utilizing external choppers and/or apparatus such as spreader boards extending rearwardly from the chopper, such apparatus could be used in cooperation with system 24, for instance, utilizing an auxiliary rearwardly directed discharge outlet on chopper 38.

Here, also, it should be noted, that the movable deflector plate 34 is just one of a variety of deflector plate configurations that can be used for guiding and directing crop residue flow through the various regions of rear end of a combine. Additionally, referring again to FIG. 6, it should be noted that, where appropriate, the direction of rotation of rotary driver 78, and thus knives 80, can be selected so as to be most advantageous for a particular configuration or application. For instance, for the configuration of FIG. 6 wherein the spreader is oriented as shown, a first rotational direction which would be clockwise as illustrated, or a second rotational direction which would be counterclockwise, can be used, and that which is more advantageous may be selected. As another example in reference to FIG. 10, rotation of driver 78 and knives 80 in the first rotational direction can be advantageous for handling fallout from flow A, as noted above.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A crop residue chopping and spreading system for an agricultural combine, comprising:

a rotary crop residue chopper disposed within a rear end portion of a cavity of the combine enclosed by a wall and roof structure, the chopper including a chopper housing including an upper portion having an intake opening positioned for receiving a stream of crop residue from a threshing system of the combine, and a lower portion including a forwardly facing discharge opening configured to direct the flow of crop residue forwardly, the chopper including a rotary driver carrying a plurality of knives and being rotatable for propelling the crop residue from the chopper housing through the discharge opening;

a rotary crop residue spreader disposed in the cavity adjacent to a rear edge of a sieve of a cleaning system of the combine and forwardly of the discharge opening of the chopper, the spreader including a spreader housing having a forwardly facing and upwardly facing inlet opening disposed for receiving an airborne flow of crop residue from the cleaning system, a rearwardly facing and upwardly facing inlet opening disposed adjacent to the forwardly facing discharge opening of the chopper for directly receiving the crop residue propelled from the forwardly facing discharge opening of the chopper, and at least one sidewardly facing outlet opening, the spreader including at least one rotary impeller disposed in the spreader housing, the rotary impeller being configured and rotatable for propelling the crop residue received through the inlet openings sidewardly outwardly through the outlet opening.

2. The system of claim 1, wherein the combine includes at least one deflector element within the cavity configurable in a windrowing configuration for directing the stream of crop residue from the threshing system over the chopper housing and outwardly from the cavity.

3. The system of claim 1, further comprising structure disposed in the cavity of the combine configurable in a non-chopping configuration for directing the stream of crop residue from the threshing system downwardly in front of the chopper housing and into at least one of the inlet openings of the spreader.

4. The system of claim 1, wherein the chopper is located directly rearwardly of the spreader.

5. The system of claim 4, further comprising structure disposed in the cavity of the combine configurable in a non-chopping configuration for directing the stream of crop residue from the threshing system downwardly in front of the chopper housing and into at least one of the inlet openings of the spreader.

6. The system of claim 4, wherein the rotary driver and the knives of the chopper can be rotated in a first rotational direction, or in an opposite second rotational direction, for propelling the crop residue generally forwardly from the chopper housing.

7. A crop residue chopping and spreading system for an agricultural combine, comprising:
a rotary crop residue chopper disposed within a rear end portion of a cavity of the combine enclosed by a wall and roof structure, the chopper including a chopper housing including an upper portion having an intake opening positioned for receiving a stream of crop residue from a threshing system of the combine, and a lower portion including a generally forwardly facing discharge opening, the chopper including a rotary driver carrying a plurality of knives and being rotatable for propelling the crop residue generally forwardly from the chopper housing through the discharge opening;
a rotary crop residue spreader disposed in the cavity adjacent to a rear edge of a sieve of a cleaning system of the combine and forwardly of the discharge opening of the chopper, the spreader including a spreader housing having a forwardly located facing and upwardly facing inlet opening disposed for receiving an airborne flow of crop residue from the cleaning system, a rearwardly facing and upwardly facing inlet opening adjacent to the forwardly facing discharge opening of the chopper disposed for directly receiving the crop residue propelled from the forwardly facing discharge opening of the chopper, and at least one sidewardly facing outlet opening, the spreader including at least one rotary impeller disposed in the spreader housing, the rotary impeller being configured and rotatable for propelling the crop residue received through the inlet openings sidewardly outwardly through the outlet opening.

8. The system of claim 7, wherein the spreader housing has an open upper portion defining the forward inlet opening and the rearward inlet opening.

9. The system of claim 7, wherein the impeller of the spreader is oriented so as to rotate about a generally horizontal axis.

10. The system of claim 7, wherein the combine includes at least one deflector element within the cavity configurable in a windrowing configuration for directing the stream of crop residue from the threshing system over the chopper housing and outwardly from the cavity.

11. The system of claim 10, wherein when the at least one deflector element is in the windrowing configuration, the rotary driver and the knives of the chopper can be rotated in a first rotational direction, for facilitating the flow of the stream of the crop residue over the chopper housing and outwardly from the cavity.

* * * * *